Dec. 24, 1940.    E. H. MUELLER    2,225,755

THROTTLING VALVE

Filed Oct. 22, 1938

INVENTOR.
Ervin H. Mueller
BY
Barnes, Kisselle, Laughlin & Raisch
ATTORNEYS

Patented Dec. 24, 1940

2,225,755

UNITED STATES PATENT OFFICE 2,225,755

THROTTLING VALVE

Ervin H. Mueller, Grosse Pointe Park, Mich.

Application October 22, 1938, Serial No. 236,387

2 Claims. (Cl. 277—66)

This invention relates to a valve arranged to be moved so as to open and close a conduit or supply line for a fluid. The valve may advantageously be used for controlling the flow of gas.

The object of the invention is to provide an improved arrangement in a valve of the type mentioned which has, primarily, two positions, namely, "off" position and "on" position, and wherein an arrangement is provided for throttling the passageway through the valve in its "on" position. To this end the valve is equipped with a throttle plug arranged to be adjusted for determining the flow area through the valve. This adjustment is ordinarily to be made in an initial installation, or at infrequent intervals, and to be maintained over a long period of time, so that when the valve is turned to full "on" position, the throttle plug determines the flow through the valve. The throttle plug is mounted in a screw-threaded manner in the valve on straight threads, so that it can be adjusted back and forth, and an arrangement is provided for frictionally holding the throttle plug in any given position of adjustment. This is accomplished in accordance with the present invention by providing the plug with integral parts so arranged that the metal is placed under stress to frictionally engage in the plug mounting.

Figure 1:
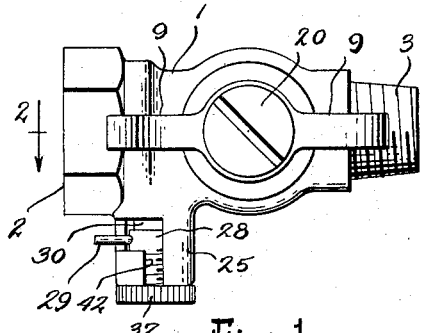
Fig. 1 is a side elevational view of a valve constructed in accordance with the invention.

The body of the valve is illustrated at 1 and it has an inlet opening 2 for receiving a conduit and a threaded outlet end 3. A bore or passageway 4 extends through the body from the inlet 2 to the outlet 3.

Figure 2:
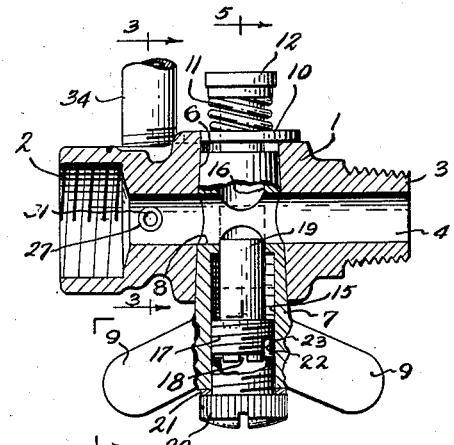
Fig. 2 is a cross sectional view taken substantially on line 2—2 of Fig. 1.
Figure 3:
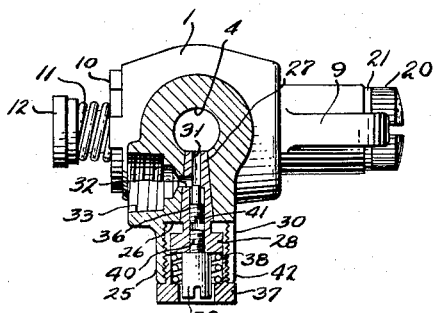
Fig. 3 is a sectional view taken on line 3—3 of Fig. 2.

The valve body is provided with a tapered valve chamber 6 intersecting the passageway 4, and in this chamber is a tapered valve member 7 having a passageway 8 therethrough. The valve member is arranged to be turned and for this purpose may have extensions 9. In Fig. 2 the valve is shown in open position with the passageway 8 lined up with the passageway 4. When the tapered valve member is turned through substantially 90°, the passageway 8 extends at right angles to the passageway 4 and the valve is closed. The valve member has a projecting portion extending through a washer 10, and surrounding the projection is a coil spring 11 reacting against the washer 10 and an enlargement 12 on the end of the projection. This serves to hold the valve member on its seat.

Figure 4:
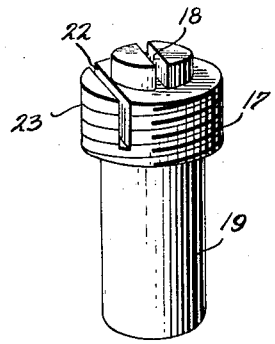
Fig. 4 is an enlarged view showing the throttle plug.

The valve member is provided with a bore, the outer end of which may be relatively enlarged as shown at 15, and the inner end of which intersects and passes through the passageway 8 as illustrated at 16. The portion 15 is provided with internal threads for receiving a throttle plug member shown in Fig. 4. This plug member has an enlarged portion 17 arranged to be screw-threaded into the bore 15 and is shaped as at 18 for the reception of a suitable tool such as a screw driver. The plug also has a throttling portion 19 arranged to project into the portion 16 of the bore. It will be observed that by turning the plug member so that it moves upwardly as Fig. 2 is viewed, the portion 19 moves into and throttles the passageway 8, thus decreasing the size of the flow aperture. By turning the throttle plug reversely so that it is retracted, the portion 19 moves in a direction out of the passageway 8, thus increasing the size of the flow aperture. Accordingly, in any given installation, the size of the flow aperture having once been determined, it will always be the same when the valve is turned to completely "on" position. This makes it unnecessary to attempt to control the size of the flow aperture by adjusting the tapered valve. A cap 20 is screwthreaded into the bore 15 to seal the bore 15 against escape of gas, for which purpose a gasket 21 may be used.

Figure 5:
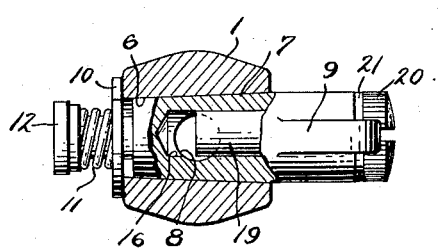
Fig. 5 is a sectional view taken substantially on line 5—5 of Fig. 2.

Now, since a given adjustment of the throttle plug should be maintained, means are provided for assuring the maintenance of any such adjustment. This means resides in the provision of a slot or kerf 22 in the throttle plug, which is defined by integral portions of the plug member, one portion being the relatively thin part 23 and the other the main body portion of the threaded part 17. The portion 23 may be deflected outwardly so that when the plug is screwed into bore 15, the part 23 is partially collapsed and the metal thereby placed under stress. As a result, the portion 23 tends to yieldably move outwardly and the interior threads of the bore 15 are yieldably engaged with pressure. The friction is sufficiently great to prevent rotary movement of the throttle plug in use so that any given adjustment is maintained. If desired, the portion 23 may be so deformed outwardly that the throttle plug is substantially locked in any given position. When the throttle plug is turned there is no tendency to scrape off or mar the threads in the bore 15 since the threads on the portion 23 accurately fit those in the bore. The pressure applied by the metal under stress is uniformly spread over the threaded surfaces, including both the peaks and valleys of the threads. In Fig. 2 the full line position shows the throttle plug in a position for quite widely opening the valve; the dotted line illustration shows a substantial throttling position. In Fig. 5 the throttle plug is illustrated in rather an intermediate position.

Where the valve is used in a gas line, it may also be arranged with a valve for controlling the flow of gas to a pilot flame. This is illustrated herein and resides in an enlargement 25 on the valve body with a bore 26 tapered in its inner portion for receiving a tapered valve member 27 having an enlarged head 28 equipped with a projection 29 extending out through a slot 30 in the enlargement. The valve member has a bore 31 and a port 32 leading to an outlet 33 to which a pipe 34 may be connected. This valve may also be provided with a throttle plug as illustrated at 36, the same being screw threaded within the valve member 27. A cap 37 is screwed into the enlargement 25 and takes the reaction of a coil spring 38 for holding the valve member 27 in its seat. The cap 37 has a central aperture for access to a sealing device 39 having a threaded portion 40 screwed into the valve 27 and having an enlarged portion which is surrounded by the spring and which seats on the enlarged head 28 of the valve to seal the same against leakage of gas.

In order to adjust the throttle plug for the pilot valve, the member 39 is removed by the use of a screw driver or other suitable tool, and then the throttle plug 36 may be adjusted for the correct flow of gas, whereupon the sealing member 39 is again screwed home to seal against the escape of gas. The small throttle plug 26 does not have enough stock for the provision of a separate kerf to provide friction for holding it in position. However, it is provided with a slot 41 which is centrally disposed for the reception of a small screw driver or the like, and the bifurcated portions on opposite sides of this slot may be spread apart to provide the requisite frictional holding action in this small plug.

The pilot valve may be turned "on" and "off" by rotating the plug 27 through the means of the extension 29 to bring the port 32 into and out of alignment with the outlet 33. In making the assembly or disassembly, the projection 29 may be moved through the slot 42 in the extension 25, which connects into the opening 30.

I claim:

1. In a valve having a body member and a valve member with passageways arranged to be brought into and out of registry by relative movement between the two, means for providing a relatively fixed throttling of the passageway comprising, a bore in one of the members intersecting the passageway, said bore having internal straight threads, a metering plug in the bore having a screwthreaded head portion mounted on the internal threads in the bore and arranged to be projected into the passageway, the head portion of the metering plug having a kerf therein positioned substantially on a chordal line to define an integral segment, said kerf having such a depth that the segment may be spread apart from the remaining portion of the head by a widening of the kerf to frictionally engage the walls of the bore to maintain the metering plug fixed in adjusted position.

2. In a valve having a body member and a rotary valve member with passageways arranged to be brought into and out of registry, a bore in the valve member having a relatively large diameter portion with internal threads and a relatively small diameter portion intersecting the passageway therein, a metering plug having a relatively large screwthreaded head portion threaded in the enlarged portion of the bore and having relatively small diameter portion arranged to be projected into the passageway for metering the same, said head portion having a kerf positioned on substantially a chordal line and having a depth such as to provide a segment adapted to be spread from the remaining portion of the head and widening of the kerf to frictionally engage the threads in the bore to maintain the plug fixed in adjusted position for a determined metering action.

ERVIN H. MUELLER.